United States Patent [19]

Yamaoka et al.

[11] Patent Number: 4,704,439
[45] Date of Patent: Nov. 3, 1987

[54] CHLORINATED LINEAR ULTRA LOW DENSITY POLYETHYLENE

[75] Inventors: Noboru Yamaoka; Shigeki Yokoyama, both of Yokohama; Kazuo Matsuura, Tokyo; Kozo Misumi, Sennan; Junichi Watanabe, Amagasaki; Seiji Kadomatsu, Toyonaka, all of Japan

[73] Assignees: Nippon Oil Company, Limited; Osaka Soda Company, Limited, both of Japan

[21] Appl. No.: 838,373

[22] Filed: Mar. 11, 1986

[30] Foreign Application Priority Data

Mar. 13, 1985 [JP] Japan .................... 60-51219

[51] Int. Cl.$^4$ ................ C08F 8/20
[52] U.S. Cl. ................ 525/334.1; 525/355; 525/356
[58] Field of Search ................ 525/334.1

[56] References Cited

U.S. PATENT DOCUMENTS 4,232,139 11/1980 Minami et al. ............ 526/124
4,433,105 2/1984 Matsuda et al. ........... 525/211
4,562,224 12/1985 Busch et al. .............. 524/519

FOREIGN PATENT DOCUMENTS 0131937 1/1985 European Pat. Off. .

Primary Examiner—Joseph L. Schofer
Assistant Examiner—Bernard Lipman
Attorney, Agent, or Firm—Scully, Scott, Murphy & Presser

[57] ABSTRACT

Chlorinated linear ultra low density polyethylene containing 3–40% by weight of chlorine produced by chlorinating a linear ultra low density polyethylene having the properties (i)–(iv) cited below, said polyethylene being produced by copolymerizing ethylene and an α-olefin having 3–12 carbon atoms in the presence of a catalyst comprising a solid catalyst component containing at least magnesium and titanium and an organic aluminum compound.

| | | |
|---|---|---|
| (i) | Melt index | 0.01–100 g/10 min |
| (ii) | Density | 0.860–0.910 g/cm$^3$ |
| (iii) | Maximum peak temperature (Tm) by the differential scanning calorimetry | not lower than 100° C. |
| (iv) | Boiling n-hexane insolubles | not less than 10% by weight |

4 Claims, 1 Drawing Figure

CHLORINATED LINEAR ULTRA LOW DENSITY POLYETHYLENE

BACKGROUND OF THE INVENTION

The present invention relates to chlorinated ultra low density polyethylene with excellent rubber-like properties. More particularly, it is concerned with chlorinated ultra low density polyethylene produced by chlorinating an ultra low density polyethylene which is produced by copolymerizing ethylene and an α-olefin by the use of a specific catalyst.

Heretofore, there has been employed as the starting polyethylene a high density and linear low-density polyethylene produced by a medium- and low-pressure process or a low density polyethylene produced by a high-pressure process.

It is widely known that chlorinated polyethylene with rubber-like properties is obtained by chlorinating an polyethylene or a copolymer of ethylene and an α-olefin. However, as such polyethylenes, which are principally a high-density polyethylene or a linear low-density polyethylene, are highly crystalline, it is necessary to introduce a substantially high proportion of chlorine into the polyethylene in order to produce a chlorinated polyethylene with rubber-like properties. On the other hand, the introduction of a high proportion of chlorine would not be desirable because of deterioration of the flexibility at low temperature possessed in nature by the polyethylene and possible evolution of a large amount of harmful gaseous substances such as gaseous chlorine although the oil resistance is improved.

Chlorinated products of α-olefin copolymer rubbers produced by using a solid catalyst containing vanadium such as ethylene-propylene copolymer rubber (EPR) and ethylene-propylene-nonconjugated diene copolymer rubber (EPDM), such copolymers being of excellent low-temperature properties but being disadvantageously of poor flowability and low tensile strength, also have disadvantages such as poor processability due to poor flowability, low tnesile strength and being too soft to be smoothly chlorinated despite of their good low-temperature properties.

Moreover, EPR and EPDM which are of good low-temperature properties but of poor heat resistance with a maximum peak temperature of below 100° C. as determined by the differential scanning calorimetry disadvantageously afford chlorinated products also with poor heat resistance. Copolymers prepared by means of a vanadium catalyst, which have a much lower dynamic viscoelasticity (E') at 0° C. as determined by the dynamic viscoelastic measurement than that of copolymers prepared by means of a titanium catalyst, produce chlorinated products of inferior heat resistance also with a lower dynamic viscoelasticity.

In addition, unlike the case in which a titanium catalyst is employed, polymers prepared by means of a vanadium-containing catalyst definitely need a catalyst-removing step because of a lower polymerizing activity and toxicity of vanadium.

SUMMARY OF THE INVENTION

It is an object of this invention to dissolve the above-mentioned problems.

Another object of the invention is to provide chlorinated polyethylene with a high crystallinity as well as with excellent low-temperature properties, processability and rubber-like properties. A further object of the invention is to provide novel chlorinated linear ultra low density polyethylene.

The present invention resides in chlorinated linear polyethylene containing 3–40% by weight of chlorine product by chlorinating a linear ultra low density polyethylene having the properties (i)–(iv) cited below which is produced by copolymerizing ethylene and an α-olefin having 3–12 carbon atoms in the presence of a catalyst comprising a solid catalyst component containing at least magnesium and titanium and an organoaluminum compound.

| | | |
|---|---|---|
| (i) | Melt index | 0.01–100 g/10 min |
| (ii) | Density | 0.860–0.910 g/cm$^3$ |
| (iii) | Maximum peak temperature (Tm) by the differential scanning calorimetry (DSC) | not lower than 100° C. |
| (iv) | Boiling n-hexane insolubles | not less than 10% by weight |

The chlorinated ultra low density polyethylene is resin with excellent low-temperature properties as well as with balanced physical properties including flowability and strength.

PREFERRED EMBODIMENTS OF THE INVENTION

The α-olefin to be copolymerized with ethylene in the ethylene-α-olefin copolymer used in the present invention (namely, ultra low density polyethylene) contains 3–12 carbon atoms. Particularly mentioned may be propylene, butene-1, 4-methylpentene-1, hexene-1, octene-1, decene-1, dodecene-1 and the like. Particularly preferred among them are propylene, butene-1, 4-methylpentene-1 and hexene-1. Dienes may also be used in combination as a comonomer, for example, butadiene, 1,4-hexadiene, vinylnorbornene, ethylidenenorbornene and the like. Content of the α-olefin in the ethylene-α-olefin copolymer is preferably 5–40 mole %.

Process for preparing the ethylene-α-olefin copolymer used in the invention will be described below.

The catalyst system used is a combination of a solid catalyst component containing at least magnesium and titanium with an organoaluminum compound. As said solid catalyst component are mentioned magnesium-containing inorganic solid compounds such as metallic magnesium, magnesium hydroxide, magnesium carbonate, magnesium oxide, magnesium chloride and the like, double salts, double oxides, carbonates, chlorides, hydroxides and the like containing a metal selected from silicon, aluminum and calcium, and further, products of treating or reacting these inorganic solid compounds with an oxygen-containing compound, a sulfur-containing compound, an aromatic hydrocarbon or a halogen-containing compound and the like on which a titanium compound is carried by a known method.

As the aforementioned oxygen-containing compound are illustratively mentioned organic oxygen-containing compounds such as, for example, water, alcohols, phenols, ketones, aldehydes, carboxylic acids, esters, polysiloxanes and acid amides and inorganic oxygen-containing compounds such as, for example, metal alkoxides and metal oxychlorides. Illustrative sulfur-containing compounds are organic sulfur-containing compounds such as thiols and thioethers and inorganic sulfur-containing compounds such as sulfur dioxide, sulfur trioxide and sulfuric acid. The aromatic hydrocarbons are illustrated by a variety of monocyclic and polycyclic aromatic hydrocarbons such as benzene, toluene xylenes, anthracene and phenanthrene. The halogen-containing substances are illustrated by chlorine, hydrogen chloride, metal chlorides and organic chlorides.

As the titanium compound may be mentioned halides, alkoxy halides, alkoxides, halogenated oxides and the like of titanium. Preferred titanium compounds are tetravalent and trivalent titanium compounds. Particular tetravalent titanium compounds which are preferred are those represented by the general formula $Ti(OR)_nX_{4-n}$ wherein R represents an alkyl, aryl or aralkyl group having 1-20 carbon atoms, X represents a halogen atom and n is $0 \leq n \leq 4$, for example, titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium, tetraphenoxytitanium and the like. As the trivalent titanium compound are mentioned those trihalogenated titanium produced by reducing a tetrahalogenated titanium such as titanium chloride and titanium bromide with hydrogen, aluminum, titanium or an organometallic compound of a metal of Group I-III of the Periodic Table. Also are mentioned trivalent titanium compounds produced by reducing a tetravalent halogenated alkoxytitanium represented by the general formula $Ti(OR)_mX_{4-m}$ wherein R represents an alkyl, aryl or aralkyl group having 1-20 carbon atoms, X is a halogen atom and m is $0 < m < 4$ with an organometallic compound of a metal of Group I-III of the Periodic Table. Among these titanium compounds, the tetravalent titanium compounds are especially preferred.

Particular catalyst systems which are preferred are, for example, combinations of a solid catalyst component of MgO—RX—TiCl$_4$ (Japanese Patent Publication No. 51-3514), Mg—SiCl$_4$—ROH—TiCl$_4$ (Japanese Patent Publication No. 50-23864), MgCl$_2$—Al(OR)$_3$—TiCl$_4$ (Japanese Patent Publications Nos. 51-152 and 52-15111), MgCl$_2$—SiCl$_4$—ROH—TiCl$_4$ (Japanese Patent Laid Open No. 49-106581), Mg(OOCR)$_2$—Al(OR)$_3$—TiCl$_4$ (Japanese Patent Publication No. 52-11710), Mg—POCl$_3$—TiCl$_4$ (Japanese Patent Publication No. 51-153), MgCl$_2$—AlOCl—TiCl$_4$ (Japanese Patent Publication No. 54-15316) or MgCl$_2$—Al(OR)$_n$X$_{3-n}$—Si(OR')$_m$X$_{4-m}$—TiCl$_4$ (Japanese Patent Laid Open No.56-95909) (wherein R and R' represent an organic radical and X represents a halogen atom) with an organoaluminum.

As examples of other catalyst systems are mentioned catalyst systems in which a reaction product of an organomagnesium compound such as Grignard compounds and a titanium compound is employed as the solid catalyst component and combined with an organoaluminum compound. As the organomagnesium compound may be employed, for example, organomagnesium compounds of the general formula RMgX, R$_2$Mg or RMg(OR) wherein R represents an organic radical having 1-20 carbon atoms and X is halogen and, complexes thereof and such organomagnesium compounds further modified by the addition of another organometallic compound, for example, an organosodium, organolithium, organopotassium, organoboron, organocalcium and organozinc compound.

As particular examples of the catalyst system may be mentioned combinations of a solid catalyst component of RMgX—TiCl$_4$ (Japanese Patent Publication No. 50-39470), RMgX-phenol-TiCl$_4$ (Japanese Patent Publication No. 54-12953), RMgX-halogenated phenol-TiCl$_4$ (Japanese Patent Publication No.54-12954) or RMgX—CO$_2$—TiCl$_4$ (Japanese Patent Laid Open No. 57-73009) with an organoaluminum compound.

Further examples of the catalyst systems to be mentioned are combinations of a solid material produced by contacting the above-mentioned solid catalyst component containing at least magnesium and titanium with an inorganic oxide such as SiO$_2$ or Al$_2$O$_3$ and an organoaluminum compound. As the inorganic oxide may be mentioned, in addition to SiO$_2$ and Al$_2$O$_3$, CaO, B$_2$O$_3$, SnO$_2$ and the like. Double oxides of these oxides may be employed without trouble. Known methods may be used for contacting these various inorganic oxides with the solid catalyst component containing magnesium and titanium. For example, the reaction in the presence or absence of an inert solvent at 20°-400° C., preferably 50°-300° C. usually for 5 minutes-20 hours, the copulverization treatment or a combination of these methods may be used.

As particular examples of these catalyst systems may be mentioned combinations of SiO$_2$—ROH—MgCl$_2$-TiCl$_4$ (Japanese Patent Laid Open No. 56-47407), SiO$_2$—R—O—R'—MgO—AlCl$_3$—TiCl$_4$ (Japanese Patent Laid Open No. 57-187305), SiO$_2$—MgCl$_2$—Al(OR)$_3$—TiCl$_4$—Si(OR')$_4$ (Japanese Patent Laid Open No. 58-21405) (wherein R and R' represent a hydrocarbon radical, respectively) with an organoaluminum compound.

In these catalyst systems, the titanium compound may be used in the form of an adduct with an organic carboxylic ester. The inorganic solid compound may also be used following a treatment by contacting with an organic carboxylic ester. Use of the organoaluminum compound in the form of an adduct with an organic carboxylic ester also produces no difficulties. In any of the catalyst systems, use of a catalyst system prepared in the presence of an organic carboxylic ester may be carried out without difficulties at all.

As the organic carboxylic ester referred to hereinabove are employed aliphatic, alicyclic and aromatic carboxylic esters, preferably aromatic carboxylic esters having 7-12 carbon atoms. Alkyl including methyl and ethyl esters of benzoic, anisic and toluic acids and the like may particularly mentioned as the examples.

As preferred examples of the organoaluminum compound to be combined with the above-mentioned solid catalyst component may be mentioned organoaluminum compounds of the general formulae R$_3$Al, R$_2$AlX, RAlX$_2$, R$_2$AlOR, RAl(OR)X and R$_3$Al$_2$X$_3$ wherein R which may be the same or different represents an alkyl, aryl or aralkyl group having 1-20 carbon atoms, and X represents a halogen atom, including triethylaluminum, triisobutylaluminum, trihexylaluminum, trioctylaluminum, diethylaluminum chloride, diethylaluminum ethoxide and ethylaluminum sesquichloride, and mixtures thereof.

Amount of the organoaluminum compound to be used is usually 0.1-1000 moles per mole of the titanium compound although there no limitation to it.

Polymerizing activity of the above-described catalyst system can markedly improved by contacting it with an α-olefin before the use in the polymerization reaction, which can be operated more easily than with the untreated catalyst system. The α-olefin employed is α-olefins containing 3-12 carbon atoms, preferably α-olefins containing 3-6 carbon atoms. As examples of the olefin may be mentioned propylene, butene-1, pentene-1, 4-methylpentene-1, hexene-1, octene-1, decene-1, dodecene-1 and the like and mixtures thereof. Contact temperature and time between the catalyst system and the α-olefin may be chosen in a wide range. For example, the contact may be at 0°–200° C., preferably 0°–100° C. for a period of 1 minute–24 hours. Amount of the α-olefin to be contacted may also be chosen in a wide range. Usually, it is desirable that the above-mentioned solid catalyst component is treated with α-olefin in an amount of about 1 g-50,000g, preferably about 5 g-30,000 g per gram of the solid catalyst component. Pressure at which the contact is made may freely be chosen. However, it is usually desirable to make the contact at a pressure of −1-100 kg/cm$^2$·G.

The organoaluminum compound to be used in the α-olefin treatment may all be combined with the above-mentioned solid catalyst component before the contact with α-olefin, or a portion of the organoaluminum compound to be used may be combined with the above-mentioned solid catalyst component and then the remaining portion may separately be added for polymerization before the polymerization reaction. Gaseous hydrogen may also be present without trouble in the contact of the catalyst system with the α-olefin. Inert gas such as nitrogen, argon or helium also may simultaneously present without trouble.

The polymerization reaction is conducted in the same way as in conventional olefin polymerization reactions using a Ziegler-type catalyst. As a matter of fact, the reaction is carried out under substantially oxygen- and water-free conditions throughout the reaction in gaseous phase or in the presence of an inert solvent or using the monomer as the solvent. The olefin polymerization is at a temperature of 20°–300° C., preferably at 40°–200° C. and a pressure from ordinary pressure to 70 kg/cm$^2$·G, preferably from 2 kg/cm$^2$·G to 60 kg/cm$^2$·G. Adjustment of the molecular weight is effectively made by adding hydrogen to the polymerization system, although it is feasible to a certain extent by changing such polymerization conditions as temperature and molar ratio of the catalyst. Of course, two or more multi-stage polymerization reactions with variations of such polymerization conditions as hydrogen concentration and polymerization temperature can be carried out without difficulties at all. Among them, polymerization process in gaseous phase is preferable.

Quite unexpectedly and surprisingly, starting materials for the chlorinated ultra low density polyethylene with excellent characteristics could be provided by the preparation of ethylene-α-olefin copolymers as specified above by copolymerizing ethylene and α-olefins having 3-12 carbon atoms in the presence of a catalyst comprising a solid catalyst component containing at least magnesium and titanium and an organoaluminum compound.

The ethylene-α-olefin copolymers according to the present invention are distinctly different from ethylene-α-olefin copolymers prepared by using as the solid catalyst component a vanadium-containing one.

The copolymers according to the invention have a higher Tm as determined by DSC and contain 10% by weight or more of boiling-hexane insolubles as compared with the conventional copolymers which contain none or a minimum amount of the insolubles even when the two are composed of the same monomers and have the same density. Due to the differences in the copolymers themselves, the copolymers according to the invention when used as the starting material for the chlorinated ultra low density polyethylene produce products with superior heat resistance and strength, and also superior in the balance of properties required for chlorinated ultra low density polyethylene. Moreover, whereas the vanadium present in the conventional copolymer as the residue from the catalyst is troublesome in its toxicity and definitely needs a catalyst-removing step, the use of titanium as in the present invention is not associated with the toxicity problem of the residue from the catalyst, and the copolymers of the invention for which a highly active catalyst in combination with a magnesium carrier is employed do not require use of a catalyst-removing step so that they are economically very advantageous.

Melt index of the ethylene-α-olefin copolymer prepared as above (as measured according to JIS K6760 at 190° C. and 2.16 kg, referred to as "MI" hereinbelow) is 0.01-100 g/10 min, preferably 0.1-50 g/10 min. Density of the same (according to JIS K6760) is 0.860-0.910 g/cm$^3$, preferably 0.870-0.905g/cm$^3$ and more preferably 0.880-0.900g/cm$^3$. Maximum peak temperature (Tm) of the same as determined by the differential scanning calorimetry (DSC) is not lower than 100° C. and preferably not lower than 110° C. It contains not less than 10% by weight, preferably 20-95% by weight and more preferably 30-90% by weight of boiling-hexane insolubles.

Processability of the ethylene-α-olefin copolymer will be inferior if the MI is lower than 0.01 g/10 min and its mechanical strength will be weaker if the MI exceeds 100 g/10 min. If its density is lower than 0.860 g/cm$^3$, the chlorinated ultra low density polyethylene will be sticky or have a lower mechanical strength; if its density exceeds 0.910 g/cm$^3$, the flexibility will be lower, and the low-temperature properties will be deteriorated. If the maximum peak temperature (Tm) is lower than 100° C., the chlorinated ultra low density polyethylene will be sticky and have a lower mechanical strength. If the boiling-hexane insolubles are less than 10% by weight, proportion of the sticky components will be higher, and the chlorinated ultra low density polyethylene will also be sticky and have a lower mechanical strength.

Boiling-n-hexane insolubles and DSC are determined in the present invention by the methods given below.

Determination of boiling n-hexane insolubles

A 200 μm thick sheet was formed using a hot press, from which were then cut out three sheets each 20 mm long 30 mm long. Using these sheets, extraction was made in boiling n-hexane for 5 hours by means of a double-tube type Soxhlet's extractor. n-Hexane insolubles were taken out and vacuum-dried (50° C., 7 hours in vacuo), and then percent insolubles in boiling n-hexane was calculated in accordance with the following equations:

Insolubles in boiling n-hexane (% by weight) =

$$\frac{\text{Weight of the sheet after the extraction}}{\text{Weight of the sheet before the extraction}} \times 100 \ (\% \text{ by weight})$$

Determination by DSC

About 5 mg of a specimen from a hot-pressed 100 μm thick film was accurately weighed and set on a differential scanning calorimeter. The temperature was raised to 170° C., and the specimen was held at that temperature for 15 minutes, thereafter cooled to 0° C. at a rate of 2.5° C./min. Then, the temperature was raised to 170° C. at a rate of 10° C./min. The temperature at the vertex position of the maximum peak of peaks that appeared during the heat-up period from 0° C. to 170° C. was taken as Tm.

Chlorination of the ultra low density polyethylene will be described below.

Chlorination of the ultra low density polyethylene used in the present invention may be carried out by known methods. For example, a suspension of the powdery polymer in water maintained at a temperature of about 70°–80° C. or preferably at 90° C. or higher is reacted with chlorine, or a solution of the polymer in an organic solvent such as tetrachloroethylene is reacted with chlorine, or a blend of the polymer with a chlorine compound such as N-chloroacetamide is heated to a temperature at which said chlorine compound is decomposed to liberate chlorine to react the polymer with the free chlorine. The chlorination in the aqueous suspension is especially preferable.

Chlorine content of the chlorinated ultra low density polyethylene according to the invention as chlorinated in such a way as described above is about 3–40% by weight and preferably 5–35% by weight. Chlorine content below 3% by weight will not sufficiently produce effect of the chlorination, whereas exceeding 40% by weight will lose crystallinity or flexibility of the polymer possibly with deteriorated heat resistance and low-temperature properties of the chlorinated ultra low density polyethylene.

The chlorinated ultra low density polyethylene can also be vulcanized by means of a conventional vulcanization process.

Determination of the chlorine content
Measured by the bomb combustion method.

Determination of the dynamic modulus of elasticity
Dynamic viscoelasticity was measured at 5 Hz and a rate of temperature increase of 2° C./min by means of the viscoelastic spectrometer VES-F manufactured by Iwamoto Seisaku-sho to determine the dynamic modulus of elasticity at 0° C.

Flex temperature
Measured according to JIS K6773 (Clash-Berg test).

The invention will be described in more details by the Examples below, but it is to be understood that the invention is not limited thereto.

The polymers used in Examples and Comparative Examples are given below.

EXAMPLE 1

An ethylene-butene-1 copolymer was prepared by copolymerizing ethylene and butene-1 using a catalyst comprising a solid catalyst component produced from substantially anhydrous magnesium chloride, 1,2-dichloroethane and titanium tetrachloride and triethylaluminum.

Butene-1 content, melt index, density, maximum peak temperature by DSC and boiling n-hexane insolubles of the ethylene-butene-1 copolymer were 11.4 mole %, 0.41 g/10 min, 0.897 g/cm$^3$, 120° C. and 87% by weight, respectively.

Preparation of chlorinated ethylene copolymer

The ethylene 1-butene-copolymer resin thus obtained was mechanically pulverized at ordinary temperature to particles passing through a 32-mesh screen (Tyler No.). In a glass-lined autoclave 100-liter in inner volume was charged 5 kg of the powdered ethylene copolymer resin together with 70 l of ion-exchanged water, 2 g of a wetting agent and 200 ml of a dispersing agent. The mixture was heated with stirring to 100° C., while introducing gaseous chlorine to initiate the reaction. Chlorination was continued at that temperature to a chlroine content of 31% by weight. The reaction mixture was then washed with water and dried. The chlorinated ethylene copolymer thus produced was preheated in a hot press at 150° C. for 5 minutes, and subjected to press under a pressure of 100 kg/cm$^2$ for 5 minutes and then to cold press under the same pressure to prepare a sheet 1.5 mm in thickness. The sheet was measured for tensile strength according to JIS K-6301 and other physical properties. The results are shown in Table 1 and FIG. 1.

EXAMPLE 2

A chlorination was conducted with the ethylene-butene-1 copolymer of Example 1 in the same way as above except that the chlorine content was 13% by weight. Physical properties were measured as in Example 1. The results are shown in Table 1 and FIG. 1.

EXAMPLE 3

A chlorination was conducted with the ethylene-butene-1 copolymer of Example 1 in the same way as above except that the chlorine content was 21% by weight. Physical properties were measured as in Example 1. The results are shown in Table 1 and FIG. 1.

COMPARATIVE EXAMPLE 1

A chlorination was conducted in the same way as in Example 1 except that high density polyethylene having a melt index of 2.6 g/10 min. and a density of 0.960 g/cm$^3$ was chlorinated while maintaining the temperature at 110°–120° C. to a chlorine content of 20% by weight. Physical properties were measured as in Example 1. The results are shown in Table 1 and FIG. 1.

COMPARATIVE EXAMPLE 2

A chlorination was conducted in the same way as in Example 1 except that LLDPE (ethylene-butene-1 copolymer) having a melt index of 0.93 g/10 min. and a density of 0.920 g/cm$^2$ was chlorinated while maintaining the temperature at 100°–110° C. to a chlorine content of 20% by weight. Physical properties were measured as in Example 1. The results are shown in Table 1 and FIG. 1.

COMPARATIVE EXAMPLE 3

An ethylene-propylene copolymer rubber was prepared using a VOCl$_3$-ethylaluminum sesquichloride catalyst. Melt index, ethylene content and density of the copolymer rubber were 0.38 g/10 min., 83 mole % and 0.862 g/cm$^3$, respectively. A chlorination was conducted in the same way as in Example 1 except that the copolymer rubber was chlorinated while maintaining the temperature at 80°–85° C. to a chlorine content of 20% by weight. The product was so low in thermal stability probably due to much residual chlorine that it was decomposed in a hot press at 150° C. No further measurements were carried out then.

COMPARATIVE EXAMPLE 4

An ethylene-butene-1 copolymer rubber was prepared using the catalyst system used in Comparative Example 3. Melt index, ethylene content and density of the copolymer rubber were 3.5 g/10 min., 94.8 mole % and 0.895 g/cm$^3$, respectively. A chlorination was conducted in the same way as in Example 1 except that the copolymer rubber was chlorinated while maintaining the temperature at 80° C. to a chlorine content of 20% by weight. The results are shown in Table 1 and FIG. 1.

COMPARATIVE EXAMPLE 5

A chlorination was initiated in the same way as in Comparative Example 4 except that the chlorination temperature was 100° C. As chlorine was introduced, lumping of the particles progressed and stirring became poor at an intermediate stage. Consequently, no further operations were carried out.

COMPARATIVE EXAMPLE 6

A chlorination was conducted in the same way as in Comparative Example 1 except that the chlorine content was 35% by weight. Physical properties of the product measured are shown in Table 1 and FIG. 1.

COMPARATIVE EXAMPLE 7

A chlorination was conducted in the same way as in Comparative Example 2 except that the chlorine content was 32% by weight. Physical properties of the product measured are shown in Table 1 and FIG. 1.

As indicated above by Examples and Comparative Examples, it has been demonstrated that there is provided according to the present invention chlorinated linear ultra low density polyethylene having a lower softening temperature, and being superior in flowability in molding and heat resistance as well as in tensile strength.

TABLE 1

| | Starting ethylene copolymer | | | | | | Chlorination reaction Chlorination temperature (°C.) |
|---|---|---|---|---|---|---|---|
| | Density | Comonomer Name | Content (mole %) | Melt Index (g/10 min) | Max. peak temp. by DSC Tm (°C.) | Boiling n-hexane insolubles (wt. %) | |
| Example 1 | 0.897 | Butene-1 | 11.4 | 0.41 | 120 | 87.0 | 100 |
| Example 2 | " | " | " | " | " | " | 100 |
| Example 3 | " | " | " | " | " | " | 100 |
| Comparative Example 1 | 0.960 | None | None | 2.6 | 127 | 99.6 | 110~120 |
| Comparative Example 2 | 0.920 | Butene-1 | 3.3 | 0.93 | 124 | 99.0 | 100~110 |
| Comparative Example 3 | 0.862 | Propylene | 17.0 | 0.38 | 33 | 0.0 | 80~85 |
| Comparative Example 4 | 0.895 | Butene-1 | 5.2 | 3.5 | 85 | 1.5 | 80 |
| Comparative Example 5 | " | " | " | " | " | " | 100 |
| Comparative Example 6 | Same as in Comparative Example 1 | | | | | | 110~120 |
| Comparative Example 7 | Same as in Comparative Example 2. | | | | | | 100~110 |

| | Physical Properties of chlorinated product | | | | | | |
|---|---|---|---|---|---|---|---|
| | Chlorine content (wt. %) | Mooney viscosity ML 1 + 4 (at 100° C.) | FP*$^1$ | Softening temperature (°C.) | Max. peak temp. by DSC Tm (°C.) | Dynamic modulus of elasticity E' (at 0° C.) (× 10$^7$ dyne/cm$^2$) | Tensile strength kg/cm$^2$ |
| Example 1 | 31 | 99 | 480 | −38 | 115 | 46.5 | 75 |
| Example 2 | 13 | 73 | 195 | −54 | 114 | 37.4 | 108 |
| Example 3 | 21 | 91 | 176 | −47 | 114 | 27.0 | 116 |
| Comparative Example 1 | 20 | 95 | 225 | −31 | 121 | 14.0 | 53 |
| Comparative Example 2 | 21 | 76 | 250 | −40 | 113 | 37.9 | 65 |
| Comparative Example 3 | Not measured due to poor heat stability. | | | | | | |
| Comparative Example 4 | 20 | 21 | 36 | −39 | 81 | 12.9 | 32 |
| Comparative Example 5 | No chlorinated product obtained due to poor stirring. | | | | | | |
| Comparative Example 6 | 35 | 123 | — | −14 | 117 | — | 126 |
| Comparative Example 7 | 32 | 61 | — | −28 | None | — | 67 |

*$^1$Ratio of MI (load 2.16 kg) to HLMI (load 21.6 kg) at 140° C.
(Larger value indicates better flowability)

The chlorinated ultra low density polyethylene produced according to the present invention is characterized by the effects cited below.
(a) Light weighed.
(b) Excellent low temperature properties.
(c) Excellent flowability to facilitate processing for forming any shape.

(d) High oil resistance.

(e) High strength as compared with chlorinated EPR and chlorinated EPDM.

(f) Good compatibility with other resins to be easily blended with other resins.

(g) Feasibility of introducing in organic fillerts at a high proportion without combination with a process oil, etc.

(h) Excellent flame retardness.

(i) Excellent heat resistance.

The present invention finds a wide scope of application due to the characteristic effects as cited above. Applications of the invention to be mentioned are, for example:

(a) Improvement of low temperature properties of such resins as polyvinyl chloride resin, polypropylene resin and acrylonitrile-butadiene-styrene resin by blending and effective use as flame retarder for polyolefins.

(b) Use for parts and coating of instruments in cold or cool places.

(c) Production of flame retarding materials by blending with flame retarders which also have excellent low temperature properties.

(d) Use as coating for car parts, hosepipes, electric wires, etc.

Figure 1:
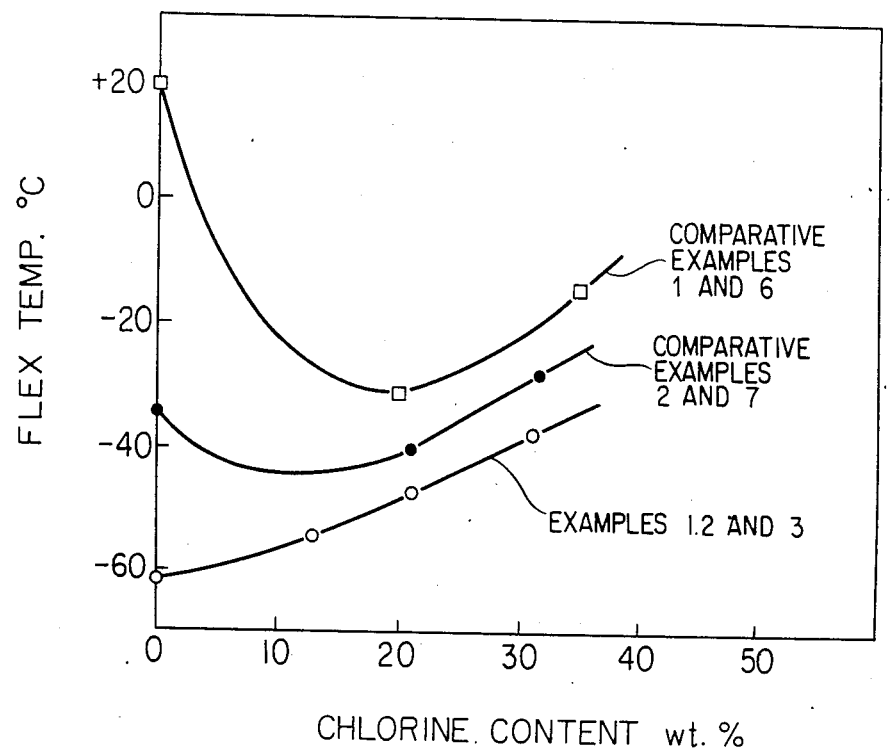
FIG. 1 is a graph indicating the relationship between chlorine content and flex temperature in Examples and Comparative Examples.

What is claimed is:

1. Chlorinated linear ultra low density polyethylene comprising the product produced by chlorinating a linear ultra low density polyethylene, said polyethylene characterized by a melt index of 0.01 to 100 g/10 min.; a density of between 0.860 and 0.910 g/cm$^3$; a maximum peak temperature ($T_m$), as determined by differential scanning calorimetry, of not less than 100° C.; and a percent boiling n-hexane insolubles of between 20 and 95% by weight, said plyethylene produced by copolymerizing ethylene and an alpha-olefin having 3 to 12 carbon atoms in the presence of a catalyst comprising a solid catalyst component containing at least magnesium and titanium and an organic aluminum compound, said alpha-olefin content in said ethylene-alpha-olefin copolymer being between 5 and 40 mol %, wherein the chlorinated linear ultra low density polyethylene contains 3 to 40% by weight chlorine.

2. Chlorinated linear ultra low density polyethylene according to claim 1 wherein the α-olefin is an α-olefin having 3–6 carbon atoms.

3. Chlorinated linear ultra low density polyethylene according to claim 1 wherein the density of the linear ultra low density polyethylene prior to chlorination is 0.870–0.905 g/cm$^3$.

4. Chlorinated linear ultra low density polyethylene according to claim 1 wherein the chlorine content is 5–35% by weight.

* * * * *